United States Patent
Gadkaree et al.

(10) Patent No.: US 9,799,459 B2
(45) Date of Patent: Oct. 24, 2017

(54) HIGH PORE VOLUME UTILIZATION CARBON AND ELECTRIC DOUBLE LAYER CAPACITOR

(71) Applicant: Corning Incorporated, Corning, NY (US)

(72) Inventors: Kishor Purushottam Gadkaree, Painted Post, NY (US); Atul Kumar, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 183 days.

(21) Appl. No.: 14/804,462

(22) Filed: Jul. 21, 2015

(65) Prior Publication Data

US 2016/0042879 A1    Feb. 11, 2016

Related U.S. Application Data

(60) Provisional application No. 62/035,045, filed on Aug. 8, 2014.

(51) Int. Cl.
*H01G 11/24* (2013.01)
*H01G 11/26* (2013.01)
(Continued)

(52) U.S. Cl.
CPC ............ *H01G 11/32* (2013.01); *C01B 31/10* (2013.01); *H01G 11/24* (2013.01); *H01G 11/34* (2013.01); *H01G 11/86* (2013.01); *Y02E 60/13* (2013.01)

(58) Field of Classification Search
None
See application file for complete search history.

(56) References Cited

U.S. PATENT DOCUMENTS

| 6,118,650 A | 9/2000 | Maeda et al. |
| 6,475,461 B1 | 11/2002 | Ohsaki et al. |

(Continued)

FOREIGN PATENT DOCUMENTS

| CN | 102515136 | 6/2012 |
| EP | 0927778 | 7/1999 |

(Continued)

OTHER PUBLICATIONS

International Search Report, issued in connection with corresponding PCT application No. PCT/US2015/043695, dated Oct. 6, 2015.

(Continued)

*Primary Examiner* — Eric Thomas
(74) *Attorney, Agent, or Firm* — John L. Haack

(57) ABSTRACT

An electric double layer capacitor electrode, including:
an activated carbon having:
a pore volume utilization efficiency (PVUE) of from about 200 to 290 F/cm$^3$, wherein PVUE is the ratio of the activated carbon gravimetric capacitance (F/g) to the pore volume (cm$^3$/g) of the activated carbon;
a low non-linearity value of from 0.1 to 5%; and
a total pore volume of from 0.32 to 0.56 cm$^3$/g.

Also disclosed is a method of making an electric double layer capacitor electrode, and a method of characterizing the performance of activated carbon, and the electrode, in an electric double layer capacitor (EDLC) device, as defined, herein.

11 Claims, 1 Drawing Sheet

(51) Int. Cl.
*C01B 31/08* (2006.01)
*H01G 11/32* (2013.01)
*H01G 11/86* (2013.01)
*C01B 31/10* (2006.01)
*H01G 11/34* (2013.01)

(56) References Cited

U.S. PATENT DOCUMENTS

| | | |
|---|---|---|
| 6,574,092 B2 | 6/2003 | Sato et al. |
| 7,091,156 B2 | 8/2006 | Hirahara et al. |
| 7,625,839 B2 | 12/2009 | Hirahara et al. |
| 7,799,733 B2 | 9/2010 | Wagh et al. |
| 7,923,411 B2 | 4/2011 | Tanaka et al. |
| 8,273,683 B2 | 9/2012 | Tanaka |
| 8,564,934 B2 | 10/2013 | Gadkaree et al. |
| 8,760,851 B2 | 6/2014 | Signorelli et al. |
| 8,848,338 B2 | 9/2014 | Norieda et al. |
| 2010/0296226 A1 | 11/2010 | Nanba et al. |
| 2011/0149473 A1 | 6/2011 | Eilertsen et al. |
| 2015/0364266 A1* | 12/2015 | Gadkaree ............... H01G 11/52 361/502 |

FOREIGN PATENT DOCUMENTS

| | | |
|---|---|---|
| EP | 1211702 | 5/2002 |
| EP | 1255261 A8 | 11/2002 |
| JP | 11293527 | 10/1999 |
| JP | 2004067498 | 3/2004 |
| JP | 2005243933 | 9/2005 |
| JP | 03792528 | 7/2006 |
| JP | 03866785 | 1/2007 |
| JP | 2007266248 | 10/2007 |
| JP | 2007269552 | 10/2007 |
| JP | 04313547 | 8/2009 |
| JP | 2010109189 | 5/2010 |
| JP | 20101114356 | 5/2010 |
| JP | 04533876 | 9/2010 |
| JP | 04576374 | 11/2010 |
| JP | 04615868 | 1/2011 |
| JP | 2011176043 | 9/2011 |
| JP | 05087466 | 12/2012 |
| JP | 05168585 | 3/2013 |
| JP | 05202460 | 6/2013 |
| JP | 05207338 | 6/2013 |
| KR | 2009082482 | 7/2009 |
| WO | 2007066792 | 6/2007 |
| WO | 2013090927 | 6/2013 |

OTHER PUBLICATIONS

Meryl D. Stoller et al., "Best practice methods for determining an electrode material's performance for ultracapacitors", Energy Environ. Sci., 2010, 3, 1294-1301.

Shenghui Guo et al., "Effects of C02 activation on porous structures of coconut shell-based activated carbons", Applied Surface Science, 255, (2009), 8443-8449.

N. Yoshizawa et al., "XRD evaluation of CO2 activation process of coal- and coconut shell-based carbons", Fuel, 79, (2000), 1461-1466.

Kunbin Yang et al., Textural characteristics of activated carbon by single step C02 activation from coconut shells, Journal of the Taiwan Institute of Chemical Engineers, 41, (2010), 367-372.

Kunbin Yang et al., Preparation of high surface area activated carbon from coconut shells using microwave heating, Bioresource Technology, 101, (2010), 6163-6169.

A.G. Pandolfo, et al., Carbon properties and their role in supercapacitors, J. Power Sources, 157 (2006), 11-27.

* cited by examiner

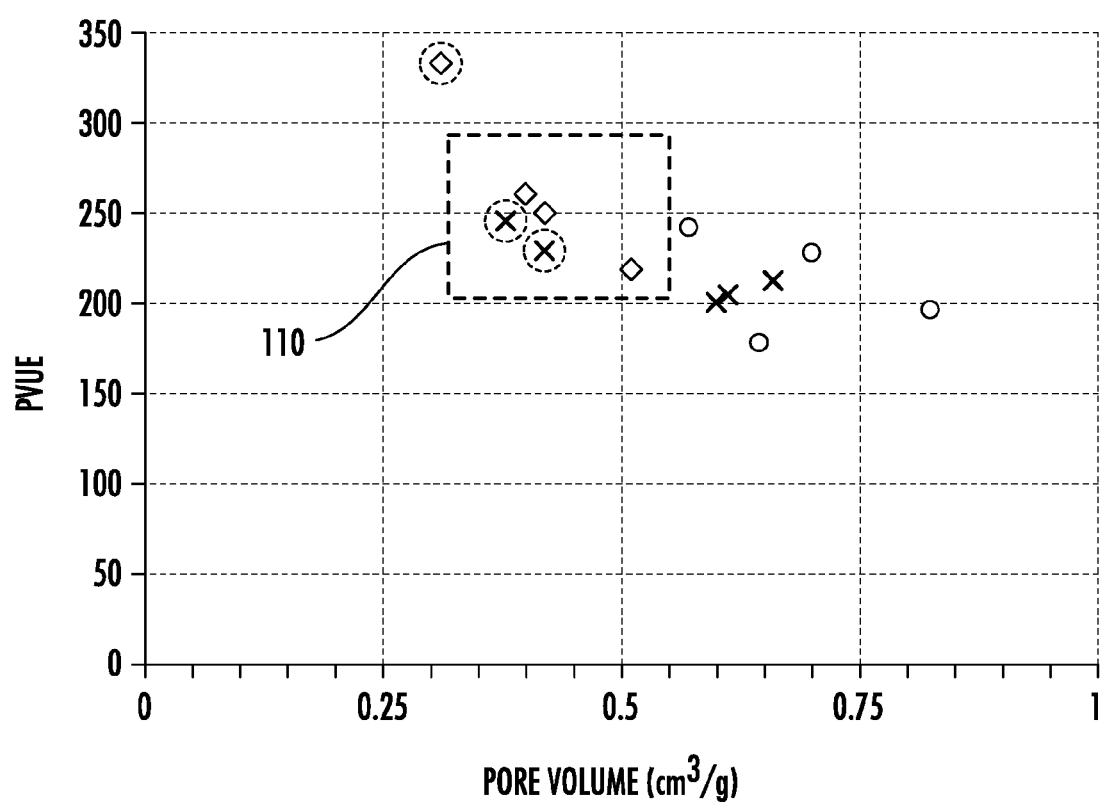

HIGH PORE VOLUME UTILIZATION CARBON AND ELECTRIC DOUBLE LAYER CAPACITOR

This application claims the benefit of priority under 35 U.S.C. §119 of U.S. Provisional Application Ser. No. 62/035,045 filed on Aug. 8, 2014, the content of which is relied upon and incorporated herein by reference in its entirety.

The entire disclosure of each publication or patent document mentioned herein is incorporated by reference.

BACKGROUND

The disclosure generally relates to the field of energy storage devices.

SUMMARY

In embodiments, the present disclosure provides an electric double layer capacitor electrode containing activated carbon having a superior pore volume utilization efficiency (PVUE) of 200 to 290 F/cc, a non-linearity of less than 5%, and having superior performance properties, for example, a higher beginning of life (BOL) capacitance and better aging characteristics.

BRIEF DESCRIPTION OF DRAWINGS

In embodiments of the disclosure:

FIG. 1 is a graph identifying a preferred range for pore volume utilization efficiency (PVUE) and pore volume for electrochemical double layer capacitor (EDLC) grade activated carbons.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed composition, component, and device, and the disclosed method of making and using provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Pore volume utilization efficiency," "PVUE," "λ," or like expressions or symbols refer to the ratio (or quotient) of the activated carbon gravimetric capacitance (F/g) to the activated carbon pore volume ($cm^3$/g), in units of (F/cc or F/$cm^3$).

"EDLC" or like expressions refer to an electrochemical or electric double layer capacitor, and as defined herein.

"Beginning of Life," "BOL," or like expressions refer to a specified and measured metric, such as capacitance or equivalent series resistance (ESR), of the component or device at the start of its service life (t=0).

"Non-Linearity," "NL %," or like expressions refer to the percent difference in cell capacitance between the energy method calculation and slope method calculation during a galvanostatic discharge test. Without wishing to be bound by theory, the non-linearity is a qualitative or semi-quantitative indicator of pore accessibility to electrolyte ions. A high non-linearity of, for example, 5 to 20% indicates an under-activated carbon, a low non-linearity of, for example, 0 to 0.1% indicates an over-activated carbon, and an intermediate non-linearity of, for example, 0.1 to 5% indicates appropriately activated carbon. Both under-activation and over-activation compromises the carbon performance in the EDLC device.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refer to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Carbon and their use in supercapacitors have been reviewed (see A. G. Pandolfo, et al., Carbon properties and their role in supercapacitors, *J. Power Sources,* 157 (2006) 11-27).

An electric double layer capacitor (EDLC), also known as ultracapacitor, is a device having high power densities and relatively high energy densities compared to conventional electrolytic capacitors. EDLC's utilize high surface area electrode materials and thin electrolytic dielectrics to achieve capacitance that is several orders of magnitude higher than conventional capacitors. This allows them to be used for energy storage rather than general purpose circuit components. Typical applications include micro hybrid, mild hybrid, full hybrid, and like automobile energy storage systems.

A typical EDLC device includes a positive and negative electrode laminated onto aluminum current collector foil. The two electrodes are separated by a porous separator paper situated between the electrodes, and wound to make a jelly roll structure, which roll is then packaged in an enclosure containing an organic electrolyte. Although not limited by theory, the porous separator paper between the positive and negative electrodes allows for the flow of ionic charge, and at same time prevents electrode-electrode contact. With potential applications in automotive sector, there is a drive towards higher energy density, higher power density, and lower cost. These requirements drive increased capacitance, widening of the electrolyte operating window, and decreasing equivalent series resistance (ESR).

The energy density (E) of an EDLC is given by the formula:

$$E = \tfrac{1}{2} CV^2,$$

where C is the capacitance and V is the voltage of the device. For achieving higher capacitance, activated carbons having high surface (e.g., 500 to 2500 $m^2/g$) have been used. More recently, engineered carbons have been developed to achieve higher specific capacitance, but the cost of these materials is still too high for use in commercial products.

Carbon activation can be accomplished conventionally with, for example, steam or alkali. The steam activated carbons are produced using a steam activation process on carbonized carbon precursors (e.g., coconut shell, wheat flour, coke, etc.), but the process has significant control and quality issues. In embodiments, the disclosure provides EDLC components, such as an electrode, and devices including the electrode, having superior carbon dioxide ($CO_2$) activated carbon and superior performance properties. Selected $CO_2$ activated carbons of the disclosure were found to have superior capacitor properties compared to other activated carbons.

Another approach to increase energy density is to improve the capacitor operating voltage. Typically, an aqueous electrolyte has been used for lower voltages (e.g., less than 1 V), and organic electrolytes find use in high voltage devices (e.g., 2.3 to 2.7 V) due to their wide operating voltage. However, to achieve even higher energy densities, there is a need to push the operating envelope from the present 2.7 V to 3.0 V, and higher. The move from 2.7 V to 3.0 V can lead to about a 23% increase in energy density. Operating at higher voltages subjects the EDLC components to several different types of stress that lead to faster deterioration. For example: mechanical stress on electrode due to movement of charged ions back-and-forth into the activated carbon nanopores, chemical stress due to generation of gases, and chemical degradation at higher voltages. The chemical stresses are primarily due to faradic charge transfer processes in the cell. These faradic charge transfer processes exhibit themselves as oxidation and reduction reactions at the positive and negative electrodes, respectively, of the EDLC. Furthermore, these reactions can be accelerated by the presence of water in the cell, which water can be associated with carbon nanopores, electrolyte, or separator materials. Typically in carbon, water may be adsorbed in carbon nanopores and is difficult to remove by conventional drying employed in manufacturing. Therefore, it is significant to first enhance the carbon performance in the cell to achieve higher energy densities, which is an approach that does not impart stress on the materials and the device.

The present disclosure provides high capacitance carbon having an excellent pore volume utilization efficiency (PVUE) property. Pore volume utilization efficiency is useful for determining the performance of activated carbon in an electric double layer capacitor (EDLC) device. The disclosed activated carbon pore volume utilization efficiency (PVUE) is the ratio of the activated carbon gravimetric capacitance (F/g) to the activated carbon pore volume ($cm^3$/g). For activated carbons known in the art and that were evaluated and compared, a lower PVUE lead to a lower capacitance in the device. A higher PVUE value lead to cation trapping, increased ionic resistance, or both. The disclosed activated carbons had intermediate PVUE values with higher device capacitance and little or no cation trapping or increased ionic resistance.

Cation trapping results from open pores in the activated carbon that contribute towards the measured surface area, but not all these pores are electrochemically accessible. Ultimately, pore sizes will approach the double layer dimensions, with the result that the movement of electrolyte will be restricted. Additionally, aging-associated deposition of decomposition products from electrolyte may inhibit ion movement or cause ion trapping, which inhibition can produce an undesired attenuation in the capacitance, cycling, or both, of the ultracapacitor over time. Increased ionic resistance results from the flow of ions in the carbon pores, which ultimately lead to thermal stresses in the cell, and lead to premature aging. Either cation trapping or the increased ionic resistance can negatively affect the life time performance of the device at, for example, 65° C. and 3 V.

In embodiments, the present disclosure provides an electric double layer capacitor (EDLC) electrode containing activated carbon having a superior pore volume utilization efficiency (PVUE).

In embodiments, the disclosure provides electric double layer capacitor (EDLC) devices having activated carbon that has a PVUE of from about 200 to 290 F/cc. Such carbons lead to high capacitive cells without cation trapping, without increased ionic resistance, or both. These activated carbons have relatively lower gravimetric capacitance, for example, less than 130 F/g, in combination with lower pore volume, for example, less than 0.55 $cm^3/g$. The activated carbons have more than 0.20 $cm^3/g$ pore volume in pores having a size of less than about 1 nm. The combination of these activated carbon attributes provide high capacitance and high life time performance characteristics of the EDLC device.

In embodiments, the present disclosure is advantaged in several aspects by providing, for example:

an EDLC containing activated carbon having a pore volume utilization efficiency of from 200 to 290 F/cc, has a high capacitance, and a high life time performance (i.e., little or no cation trapping, an increased ionic resistance, or both);

unactivated carbons having a relatively lower pore volume, for example, less than 0.5 $cm^3/g$;

activated carbons having a relatively lower pore volume require less electrolyte due to better utilization of electrolyte-carbon surface interface;

activated carbons having a relatively lower pore volume have a lower surface area, and consequently have potential for reduced faradic reactions; and activated carbons having a relatively lower pore volume have a lower surface area, and consequently have a lower moisture uptake.

In embodiments, the present disclosure provides an electric double layer capacitor electrode, comprising:

an activated carbon having:

a pore volume utilization efficiency (PVUE) (also known as the "intrinsic volumetric capacitance" of the carbon, and distinguished from conventional "volumetric capacitance" of the electrode) of from about 200 to 290 F/cm$^3$, wherein PVUE is the ratio or quotient of the activated carbon gravimetric capacitance (F/g) over the pore volume (cm$^3$/g) of the activated carbon;

a low non-linearity value of from 0.1 to 5%; and a total pore volume of from 0.32 to 0.56 cm$^3$/g.

In embodiments, the electrode can have at least one high capacitive cell having a gravimetric capacitance of from 90 to 130 F/g, which cell is free of cation trapping, free of increased ionic resistance, or both.

In embodiments, the activated carbon can have a gravimetric capacitance of, for example, from 50 to 130 F/g, from 90 to 130 F/g, including intermediate values and ranges, such as 105 F/g or 110 F/g; a pore volume of from 0.32 to 0.56 cm$^3$/g, of from 0.35 to 0.45 cm$^3$/g, including intermediate values and ranges, such as 0.4 cm$^3$/g; and a pore volume utilization efficiency of, for example, from 200 to 290 F/cc, from 230 to 270 F/cc, including intermediate values and ranges, such as 262 F/cc.

In embodiments, the activated carbon can have a pore volume of, for example, from 0.25 to 0.4 cm$^3$/g, including intermediate values and ranges, such as 0.25 cm$^3$/g in pores having a diameter less than or equal to 1 nm, such as from 0.01 to 1 nm In embodiments, the electrode in a large cell format having a TEMA-TFB electrolyte, the cell can have an ESR of from 0.35 to 7 milliohms (mΩ), such as 0.56 milliohms.

In embodiments, the carbon dioxide activated carbon electrode in a large cell format having a TEMA-TFB electrolyte, and in a 3.0 V stress test, has a capacitance degradation at 50 hrs of about 6 to 7%, such as 6.4%.

In embodiments, the disclosure provides a method of making an electric double layer capacitor electrode, comprising:

activating a carbon by heating a char in a furnace, for example, at from 700 to 1000° C. for from 2 to 6 hrs, at from 0.5 to 5 rpm, such as 850° C. for 4.25 hrs at 1.5 rpm, and the furnace having a CO$_2$ volumetric flow rate of about 10 to 20 liters per minute per kg of furnace load, such as 1 liter per minute for a 0.1 kg carbon load, to form a carbon dioxide activated carbon; and forming an electrode with the carbon dioxide activated carbon.

In embodiments, the activated carbon has a gravimetric capacitance of, for example, 90 to 130 F/g, such as 105 F/g, the pore volume is from 0.32 to 0.56 cm$^3$/g, such as 0.4 cm$^3$/g, and the pore volume utilization efficiency (PVUE) of the carbon is from 200 to 290 F/cc, such as 262 F/cc.

In embodiments, the activated carbon has a pore volume of from 0.2 to 0.4 cm$^3$/g, such as 0.25 cm$^3$/g in pores having a diameter less than or equal to 1 nm, such as from 0.01 to 1 nm.

In embodiments, the disclosure provides a method of characterizing the performance level of an activated carbon in an electric double layer capacitor (EDLC) device, comprising:

determining the pore volume utilization efficiency (PVUE) of the activated carbon in an EDLC device by:
measuring the gravimetric capacitance (F/g) of the activated carbon;
measuring the pore volume (cm$^3$/g) of the activated carbon; and
calculating the PVUE of the activated carbon by dividing the measured gravimetric capacitance by the measured pore volume.

In embodiments, the performance level of the EDLC device is:

excellent if the activated carbon has at least one of:
a PVUE of from about 200 to 290 F/cm$^3$;
a low non-linearity value in a symmetrical cell of from 0.1 to 5%; and
a total pore volume of from 0.32 to 0.56 cm$^3$/g, or a combination thereof;

moderate if the activated carbon has:
a PVUE of from about 290 to 400 F/cm$^3$;
a non-linearity value of from 5 to 8%; and
a total pore volume of from 0.2 to 0.32 cm$^3$/g; or poor if the activated carbon has:
a PVUE of from about 100 to 200 F/cm$^3$;
a non-linearity value of from greater than 8%; and
a total pore volume of from less than 0.2 cm$^3$/g, wherein PVUE is the quotient of the activated carbon gravimetric capacitance (F/g) over the pore volume (cm$^3$/g) of the activated carbon.

In embodiments, the disclosure provides an electric double layer capacitor electrode, and a high capacitance electric double layer capacitor device incorporating the electrode, which device can operate at higher voltages (e.g., 2.7 to 3.3 V) without significant degradation.

The EDLC device can be characterized by using a carbon having a superior pore volume utilization efficiency such as from 200 to 290 F per cm$^3$.

The combination of these carbon attributes enables high capacitance and high life time performance characteristics of the EDLC device.

In the prior art pore volume and pore volume distribution is measured by nitrogen adsorption measurement in the carbon pores. The nitrogen molecule generally has a smaller size and no charge compared to the electrolyte ions used in the EDLC devices. Thus during charging of the device, all of the pore volume, and in particular the micropores, may not be accessible to the electrolyte ions. Accordingly, nitrogen adsorption measurement may not be sufficiently accurate for use in pore volume measurement and as an indicator of the carbon performance. The disclosed PVUE relates the pore volume measurement to the accessible part of the pore structure for the electrolyte ions, and is a more fundamental and accurate measure based on two fundamental measurements.

In embodiments, the disclosure provides a demonstration of an unexpected result of a carbon having high capacitance performance even though the carbon's pore volume is relatively low. The disclosure also provides a demonstration of the inadequacy of the pore volume measurement method. The disclosed PVUE parameter and examples of its applicable range provide design guidance for making an EDLC device having high capacitance, and an EDLC device that is free of cation trapping, free of increased ionic resistance, or both.

State-of-the art EDLC's use carbon having a gravimetric capacitance of 120 F/g and pore volume of about 0.59 cm$^3$/g. The carbon gravimetric capacitance is measured using button cells with 1M TEA-TFB electrolyte and Gamry Instruments potentiostat/galvanostat instrument. The pore volume is determined utilizing N$_2$ adsorption on a Micrometrics ASAP 2420 and calculated using the Density Functional Theory (DFT) assuming slit pores. The pore volume utilization efficiency is ratio of gravimetric capacitance to pore volume, and was calculated to be 203 F/cc.

The pore volume utilization efficiency (PVUE or λ), can be calculated by the formula:

$$\lambda = GC/PV$$

where GC is the gravimetric capacitance (F/g) and PV is pore volume (cm³/g).

Procedurally, the PVUE can be determined according to:
measuring the gravimetric capacitance (F/g) of the activated carbon;
measuring the pore volume (cm³/g) of the activated carbon; and
dividing the measured gravimetric capacitance (F/g) of the activated carbon by the measured pore volume (cm³/g) of the activated carbon.

State-of-the art EDLC devices are commercially available in several design and size configurations from, for example, Maxwell, Ioxus, and Nesscap. In particular, the Maxwell EDLC (BCAP2000 P270 K04) is a 2000 F rated 2.7 V device containing TEA-TFB electrolyte, and is capable of operating at up to 65° C.

In embodiment, the disclosure provides a high capacitance carbon to improve the energy density of the EDLC device. Conventionally, this approach has led to development of high surface area carbons, which lead to high gravimetric capacitance. However, in most instances, the carbon pore volume is significantly higher, and leads to lower pore volume utilization efficiency.

In embodiment, the disclosure provides a comparative Example 7 that uses a KOH alkali activated carbon having a high gravimetric capacitance of, for example, 160 F/g, and a high pore volume of, for example, 0.7 cm³/g. The pore volume utilization efficiency was calculated as 229 F/cc. A vast majority of pores are not electrochemically accessible. Ultimately, pore sizes will approach the double layer dimensions, with the result that the movement of electrolyte will be restricted. Additionally, aging-associated deposition of decomposition products from electrolyte may inhibit ion movement or cause ion trapping, which can produce an undesired attenuation in the capacitance over time, cycling of the EDLC device, or both.

In embodiments, the electrolyte typically comprises an ionic salt dissolved in a solvent and the electrolyte can be adapted to permeate the porous electrodes and the porous separator. With such ionic salts (e.g., TEA-TFB, tetraethyl ammonium tetrafluoroborate), the tetraethyl ammonium ($(Et)_4N^+$) cation is larger than the tetraflouroborate ($BF_4^-$) anion. The size of the $(Et)_4N^+$ cation is about 0.68 nm, and the size of the $BF_4^-$ anion is about 0.48 nm.

Commonly owned and assigned U.S. Pat. No. 8,564,934, mentions that the pore size and the pore size distribution in carbon-based electrodes can be optimized to account for the disparate ion sizes typically encountered in salt-based electrolytes. Specifically, the loss of capacitance (e.g., due to ion trapping) can be minimized by, for example, adjusting the pore size and pore size distribution of the activated carbon, such as by selection or by chemical modification, to the size of the ion that interacts with that particular carbon-based electrode.

The above '934 patent also mentions a tuned cell configuration with TEMA-TFB. The tuned cell configuration requires first and second carbon materials having distinct pore size distribution, wherein a pore volume ratio of the first carbon material is greater than a pore volume ratio of the second carbon material, the pore volume ratio R defined a $R = V_1/V$, where $V_1$ is a total volume of pores having a pore size of less than 1 nm, and V is total volume of pores having a pore size greater than 1 nm. The EDLC with this configuration has a higher beginning of life capacitance compared to symmetric YP50F EDLC, and better initial aging performance compared to symmetric alkali activated microporous carbon EDLC. However, such a tuned cell configuration requires complicated manufacturing strategy including, for example, separate electrode processes for positive and negative electrodes, which can add unnecessary cost to the device.

Accordingly, the present disclosure provides a symmetric EDLC configuration and carbon having pore volume utilization efficiency of from 200 to 290 F/cc. Activated carbon that meet this criterion provides high capacitance and life time performance in the device. These carbons, having a relatively lower pore volume, for example, less than 0.6 cm³/g such as from 0.32 to 0.56 cm³/g, and call for lower levels of electrolyte in the EDLC device to provide additional device cost reductions. Lower pore volume also leads to lower moisture in the carbon allowing for simpler and easier drying process for making activated carbon electrodes.

Referring to the Figure, FIG. 1 is a graph identifying a preferred region (110) for pore volume utilization efficiency (PVUE) and pore volume for electrochemical double layer capacitor (EDLC) grade activated carbons. The data points within the preferred region (110) and that do not have a high linearity are preferred. The data points are marked by symbols for the inventive and comparative carbons listed in Table 1 as follows: carbon dioxide activated carbon samples are designated with an open square or diamond ("◇"); the steam activated carbon samples are designated with a cross ("X"); the KOH activated carbon samples are designated with an open circle ("○"); and any activated carbon sample having a high non-linearity of greater than 5% are designated with an open dotted line circle or halo ("○"). A high non-linearity of greater than 5% will lead to a high ESR in symmetric cells.

EXAMPLES

The following Examples demonstrate making, use, and characterization of the disclosed high capacitance electric double layer capacitor and methods of making and using in accordance with the disclosure and above teachings. The following Examples also demonstrate general procedures, preparative methods, and characterization.

Preparative Example

Carbon Dioxide Activated Carbon

In an exemplary carbon dioxide activation preparative example, ground coconut char was activated in a rotary furnace at 850° C. for 4.25 hours at 1.5 rpm and a $CO_2$ volumetric flow rate of 1 liter per minute (lpm). The carbon loading was 20 grams. The carbon dioxide activated carbon had a capacitance performance in button cell testing of 80.2 F/g. Although not limited by theory, the high capacitance is believed to be the result of the high pore volume utilization efficiency. The gravimetric capacitance of the carbon was 105 F/g, and the pore volume was 0.4 cm³/g. The carbon had a pore volume of 0.25 cm³/g in pores less than 1 nm. The pore volume utilization efficiency of the carbon was 262 F/cc. The carbon was tested in a large cell format with TEMA-TFB electrolyte. The ESR of the cell was 0.56 milliohms (mΩ). The cell was put on 3.0 V stress test, and the capacitance degradation at 50 hrs was about 6.4%.

Comparative Example 1

YP50 carbon (TEMA)—lower pore volume utilization ($\lambda$=200 F/cc), Low Capacitance, and Low ESR. This example used steam activated carbon derived from coconut char similar to the ones used in commercial devices such as Maxwell BCAP P270 K04. The carbon (YP50F) is available commercially from Kuraray Chemicals and has a gravimetric and volumetric capacitance of 120 F/g and 69 F/cc, respectively in button cell measurements (with 1.5 M TEA-TFB). The pore volume of the carbon was measured to be 0.60 cm$^3$/g. The pore volume utilization efficiency is calculated to be 200 F/cc.

EDLC were fabricated with symmetric design, i.e. YP50 carbon on positive and negative electrode. The activated carbon was mixed with PTFE (DuPont 601A) and Carbon Black (Cabot BP2000) in the ratio of 85:10:5 in high intensity Henschel shear mixer (FML 10 fitted with double helical blunt blades) at 5° C. The mixing speed was set at 2000 rpm and mixing time was 40 min Around 5% isopropyl alcohol (IPA) by weight was introduced in the mix after 35 min of dry mixing, followed by an additional 5 min wet mixing. IPA was added during the mixing step to aid in fibrillation. After the electrode constituents were uniformly dispersed and distributed, fibrillation was performed. A 4" micronizer jet mill with a tungsten carbide lining was used for the fibrillation. The material was sieved through a 10 mesh screen to break clumps before feeding into the jet mill. A feed pressure was set to 70 psi, grind pressure to 85 psi and feed rate to 1020 g/hr. The powder obtained from micronizer was de-agglomerated using a hammer mill (Fitz Mill). The powder mix was then calendared by passing it through series of pressure rollers at 100° C. forming a 100 micrometers (μm) thick free stand-alone sheet. Two of these free standing carbon webs were laminated on each side of conductive carbon ink-coated current collector to obtain an electrode. The current collector was a 25 micron thick aluminum foil with about a 5 micrometers thick coating of conductive carbon ink (DAG EB012 from Henkel, formerly Acheson). Two of such electrodes (positive and negative electrode with YP50 carbon), separated by a porous separator paper TF4030 (from Nippon Kodoshi Corporation), were wounded into a "jelly roll" and packaged/sealed in aluminum can to form the EDLC device. The device was vacuum dried at 130° C. for 48 hrs before being filled with 1.2 M of TEMA-TFB electrolyte. The cell was conditioned and then subjected to constant voltage stress test at 3.0 V. The beginning of life (BOL) equivalent series resistance (ESR) is 0.41 mΩ and the capacitance degradation at 50 hours was approximately 6.0%.

Comparative Example 2

Haycarb HDLC 20B—lower pore volume utilization ($\lambda$=203 F/cc) and Low Capacitance. This example used steam activated carbon derived from coconut char similar to the ones used in commercial devices such as Maxwell BCAP P270 K04. The carbon is available commercially from Haycarb and has a gravimetric and volumetric capacitance of 124 F/g and 70 F/cc, respectively, in button cell measurements (with 1.5 M TEA-TFB). The pore volume of the carbon was measured to be 0.61 cm$^3$/g. The pore volume utilization efficiency was calculated to be 203 F/cc.

Comparative Example 3

Calgon ELITEC—high pore volume and low capacitance. This example used steam activated carbon derived from coconut char similar to the ones used in commercial devices such as Maxwell BCAP P270 K04. The carbon is available commercially from Calgon and has a gravimetric and volumetric capacitance of 140 F/g and 79 F/cc, respectively, in button cell measurements (with 1.5 M TEA-TFB). The pore volume of the carbon was measured to be 0.66 cm$^3$/g. The pore volume utilization efficiency is calculated to be 212 F/cc.

Comparative Example 4

Boyce—low capacitance and high non-linearity. This example used steam activated carbon derived from coconut char similar to the ones used in commercial devices such as Maxwell BCAP P270 K04. The carbon is available commercially from Boyce and has a gravimetric and volumetric capacitance of 93 F/g and 61 F/cc, respectively, in button cell measurements (with 1.5 M TEA-TFB). The carbon has high non-linearity value of 9.3% as measured from button cell testing, and will lead to high ESR in the cells. High non-linearity values, such as 6 to 15, are indicative of carbon that is only partially activated, which is substantiated or confirmed from a low pore volume value of 0.38 cm$^3$/g. The pore volume utilization efficiency was calculated to be 245 F/cc.

Comparative Example 5

Indo German—low capacitance and high non-linearity. This example used steam activated carbon derived from coconut char similar to the ones used in commercial devices such as Maxwell BCAP P270 K04. The carbon is available commercially from Indo German and has a gravimetric and volumetric capacitance of 96 F/g and 65 F/cc, respectively, in button cell measurements (with 1.5 M TEA-TFB). The carbon has high non-linearity value of 7.3% as measured from button cell testing, and will lead to high ESR in the cells. High non-linearity is indicative of carbon that is only partially activated, which is substantiated or confirmed from a low pore volume value of 0.42 cm$^3$/g. The pore volume utilization efficiency was calculated to be 229 F/cc.

Comparative Example 6

Wheat flour derived KOH carbon—lower pore volume utilization ($\lambda$=229 F/cc) and higher capacitance, cation trapping. To achieve higher capacitance, alkali activated microporous carbon was used. The carbon has 0.45 cm$^3$/g pore volume in pores less than or equal to 1 nm range, a pore volume of 0.21 cm$^3$/g in pores between greater than 1 nm and less than or equal to 2 nm, and a pore volume of 0.02 cm$^3$/g in pores greater than 2 nm. This carbon was made from KOH alkali activation of a non-lignocellulosic carbon precursor such as wheat flour. The gravimetric and volumetric capacitance of carbon as measured from button cell measurements were 160 F/g and 90 F/cc, respectively. The pore volume of the carbon was measured to be 0.7 cm$^3$/g. The pore volume utilization efficiency was calculated to be 229 F/cc.

EDLCs were fabricated with this carbon on both electrodes using a process similar to Example 1. The beginning of life (BOL) ESR was 0.51 mΩ. The capacitance degradation at 50 hours was approximately 9.2%. As stated above, the aging-associated deposition of decomposition products from the electrolyte may inhibit ion movement or cause ion trapping, which can lead to an undesired attenuation in the capacitance over time, cycling of the ultracapacitor, or both.

Comparative Example 7

Green Coke derived KOH carbon—lower pore volume utilization ($\lambda$=178 F/cc) This example used a green coke carbon precursor and a KOH activation process to make an activated carbon. The activated carbon has a gravimetric and volumetric capacitance of 115 F/g and 80 F/cc, respectively, in button cell measurements (with 1.5 M TEA-TFB electrolyte). The pore volume utilization efficiency was calculated to be 178 F/cc.

Comparative Example 8

Kansai Coke—lower pore volume utilization ($\lambda$=198 F/cc) This example used commercially available Kansai Coke activated carbon. The carbon was activation processed using a KOH alkali process. The activated carbon has a gravimetric and volumetric capacitance of 162 F/g and 83 F/cc, respectively, in button cell measurements (with 1.5 M TEA-TFB). The pore volume utilization efficiency was calculated to be 198 F/cc.

Comparative Example 9

Kuraray Meso Carbon Pitch derived KOH carbon—high pore volume ($\lambda$=178 F/cc). This example used commercially available Kuraray Meso Carbon Pitch. The carbon was activation processed using KOH alkali process. The activated carbon has a gravimetric and volumetric capacitance of 138 F/g and 79 F/cc, respectively, in button cell measurements (with 1.5 M TEA-TFB). The pore volume utilization efficiency was calculated to be 242 F/cc.

Example 10

$CO_2$ activated coconut carbon—higher capacitance, lower degradation, and high pore volume utilization ($\lambda$=250 F/cc) In this example, the carbon was made by activating ground coconut char in rotary furnace at 850° C. for 4.5 hours, at 1.5 rpm, and a $CO_2$ flow rate of 18 lpm. The carbon loading was 1,000 g. The gravimetric and volumetric capacitance of this carbon as measured from button cell measurements were 105 F/g and 72 F/cc, respectively. The pore volume of the carbon was measured to be 0.42 cm³/g. The pore volume utilization efficiency was calculated to be 250 F/cc. An EDLC was fabricated with this carbon on both electrodes using a process similar to Example 1. The beginning of life (BOL) ESR was 0.46 mΩ and capacitance degradation at 50 hours was approximately 6.3%. The carbon exhibits high capacitance and low initial capacitance degradation.

Example 11

$CO_2$ activated coconut carbon—higher capacitance, lower degradation, and high pore volume utilization ($\lambda$=220 F/cc) In this example, the carbon was made by activating ground coconut char in rotary furnace at 850° C. for 5 hours, at 1.5 rpm, and a $CO_2$ flow rate of 18 lpm. The carbon loading was 1,000 g. The gravimetric and volumetric capacitance of carbon as measured from button cell measurements were 112 F/g and 84 F/cc, respectively. The pore volume of the carbon was measured to be 0.51 cm³/g. The pore volume utilization efficiency was calculated to be 220 F/cc. An EDLC was fabricated with this carbon on both electrodes using a process similar to Example 1. The beginning of life (BOL) ESR was 0.43 mΩ and capacitance degradation at 50 hours was approximately 5.5%. The carbon exhibits high capacitance and low initial capacitance degradation.

Example 12

$CO_2$ activated coconut carbon—higher capacitance, and high pore volume utilization ($\lambda$=260 F/cc). In this example, the carbon was made by activating ground coconut char in rotary furnace at 850° C. for 4.25 hrs, at 1.5 rpm, and a $CO_2$ flow rate of 1 lpm. The carbon loading was 20 g. The gravimetric and volumetric capacitance of carbon as measured from button cell measurements were 104 F/g and 78 F/cc, respectively. The pore volume of the carbon was measured to be 0.4 cm³/g. The pore volume utilization efficiency was calculated to be 260 F/cc.

Example 13

$CO_2$ activated coconut carbon—high pore volume utilization ($\lambda$=332 F/cc) and high non-linearity In this example, the carbon was made by activating ground coconut char in rotary furnace at 850° C. for 3.75 hrs, at 1.5 rpm, and a $CO_2$ flow rate of 18 lpm. The carbon loading was 20 g. The gravimetric and volumetric capacitance of carbon as measured from button cell measurements were 103 F/g and 70 F/cc, respectively. The pore volume of the carbon was measured to be 0.31 cm³/g. The pore volume utilization efficiency was calculated to be 332 F/cc. The non-linearity value as measured from button cell measurements was 7%, consequently a cell with this carbon will lead to higher ESR (in symmetric configuration).

Table 1 lists experimental and inventive carbon dioxide activated carbon samples having pore volumes in the range of 0.32 to 0.56 cm³/g with a PVUE in range of 200 to 290 F/cc have better performance (i.e., higher BOL capacitance and better aging characteristics). An activated carbon generally should have non-linearity less than 5%, otherwise higher ESR cation trapping, or both, will result if used in symmetric cells.

The disclosure has been described with reference to various specific embodiments and techniques. However, it should be understood that many variations and modifications are possible while remaining within the scope of the disclosure.

TABLE 1

Examples of different EDLC configurations of the disclosure.

| Example# | Description (activation method) | Button Cells - Volumetric Capacitance (F/cc) | Button Cells - Gravimetric Capacitance (F/g) | Pore Volume (cm3/g) | PVUE | Cell-ESR (milliohms) | Cell - Capacitance Degradation after 50 hrs (%) | Non-Linearity from Button Cell Measurements (NL %) |
|---|---|---|---|---|---|---|---|---|
| Comp Ex 1 | Kuraray YP50 (Steam) | 69 | 120 | 0.60 | 200 | 0.41 | 6% | less than 2 |
| Comp Ex 2 | Haycarb HDLC 20B (Steam) | 70 | 124 | 0.61 | 203 | n/a[1] | n/a[1] | 0.5 |
| Comp Ex 3 | Calgon Elite C (Steam) | 79 | 140 | 0.66 | 212 | n/a[1] | n/a[1] | n/a |
| Comp Ex 4 | Boyce (Steam) | 61 | 93 | 0.38 | 245 | n/a[1] | n/a[1] | 9.3 (not completely activated) |
| Comp Ex 5 | Indo German (Steam) | 65 | 96 | 0.42 | 229 | n/a[1] | n/a[1] | 7.3 (not completely activated) |
| Comp Ex 6 | Corning Carbon (KOH) | 90 | 160 | 0.70 | 229 | 0.51 | 9.20% | about 5 |
| Comp Ex 7 | Green Coke activated at Corning (KOH) | 80 | 115 | 0.65 | 178 | n/a | n/a | about 5 |
| Comp Ex 8 | Kansai Coke MSP20 (KOH) | 83 | 162 | 0.82 | 198 | n/a | n/a | 4 |
| Comp Ex 9 | Kuraray Mesocarbonpitch NY1251 (KOH) | 79 | 138 | 0.57 | 242 | n/a | n/a | 5 |
| Ex 10 | coconut carbon - symmetric ($CO_2$) | 72 | 105 | 0.42 | 250 | 0.46 | 6.30% | 4 |
| Ex 11 | coconut carbon - symmetric($CO_2$) | 84 | 112 | 0.51 | 220 | 0.43 | 5.50% | 3 |
| Ex 12 | coconut carbon - symmetric (small rotary)($CO_2$) | 78 | 104 | 0.4 | 260 | n/a | n/a | 5 |
| Ex 13 | coconut carbon - symmetric (HazenBK22)($CO_2$) | 70 | 103 | 0.31 | 332 | n/a | n/a | 7 (not completely activated) |

[1]"n/a" indicates data "Not Available".

What is claimed is:

1. An electric double layer capacitor electrode, comprising:
   an activated carbon having:
   a pore volume utilization efficiency (PVUE) of from 200 to 290 F/cm$^3$, wherein PVUE is the quotient of the activated carbon gravimetric capacitance (F/g) over the pore volume (cm$^3$/g) of the activated carbon;
   a low non-linearity value of from 0.1 to 5%; and
   a total pore volume of from 0.32 to 0.56 cm$^3$/g.

2. The electrode of claim 1 wherein the activated carbon is a carbon dioxide activated carbon.

3. The electrode of claim 1 wherein the electrode has at least one high capacitive cell having a gravimetric capacitance of from 90 to 30F/g, which cell is free of cation trapping, free of increased ionic resistance, or both.

4. The electrode of claim 1 wherein the activated carbon has a gravimetric capacitance of from 50 to 130F/g.

5. The electrode of claim 1 wherein the activated carbon has a gravimetric capacitance of 90 to 130F/g, a pore volume of 0.35 to 0.45 cm$^3$/g, and a pore volume utilization efficiency of 230 to 270 F/cc.

6. The electrode of claim 1 wherein the activated carbon has a pore volume of 0.25 to 0.4 cm$^3$/g in pores having a diameter of from 0.01 to 1 nm.

7. The electrode of claim 1 wherein the electrode in a large cell format having a TEMA-TFB electrolyte, the cell has an ESR of 0.35 to 7 milliohms.

8. The electrode of claim 1 wherein the electrode in a large cell format having a TEMA-TFB electrolyte, and in a 3.0 V stress test, has a capacitance degradation at 50 hrs of from 6 to 7%.

9. A method of making an electric double layer capacitor, comprising:
   an activated carbon having:
   a pore volume utilization efficiency (PVUE) of from 200 to 290 F/cm$^3$, wherein PVUE is the quotient of the activated carbon gravimetric capacitance (F/g) over the pore volume (cm$^3$/g) of the activated carbon;
   a low non-linearity value of from 0.1 to 5%; and
   a total pore volume of from 0.32 to 0.56 cm$^3$/g the method comprising:
   activating a carbon by heating a char in a furnace at from 700 to 1,000° C. for from 2 to 6 hrs, at from 0.5 to 5 rpm, and the furnace having a $CO_2$ volumetric flow rate of about 10 to 20 liter per minute per kg of furnace load, to form a carbon dioxide activated carbon; and
   forming an electrode with the carbon dioxide activated carbon.

10. The method of claim 9 wherein the activated carbon has a gravimetric capacitance of from 50 to 130 F/g, a pore volume of from 0.32 to 0.56 cm$^3$/g, and a pore volume utilization efficiency of from 200 to 290 F/cc.

11. The method of claim 9 wherein the activated carbon has pore volume of from 0.25 to 0.4 cm$^3$/g in pores having a diameter from 0.01 to 1 nm.

* * * * *